(12) United States Patent
Ellis (10) Patent No.: US 6,594,949 B2
(45) Date of Patent: Jul. 22, 2003

(54) POTTING MACHINES AND METHODS

(76) Inventor: C. Mitchell Ellis, 7461 Lott Rd., Wilmer, AL (US) 36587

( * ) Notice: Subject to any disclaimer, the term of this patent is extended or adjusted under 35 U.S.C. 154(b) by 0 days.

(21) Appl. No.: 09/973,950

(22) Filed: Oct. 11, 2001

(65) Prior Publication Data

US 2003/0070352 A1 Apr. 17, 2003

(51) Int. Cl.[7] .............................................. A01G 9/08
(52) U.S. Cl. ................................ 47/1.01 P; 47/1.01 R
(58) Field of Search ........................... 47/1.01 R, 1.01 P (56) References Cited

U.S. PATENT DOCUMENTS

| | | | |
|---|---|---|---|
| 2,826,003 A | * 3/1958 | Oki et al. | 47/1.01 R |
| 3,012,370 A | * 12/1961 | Lortz et al. | 141/103 |
| 3,337,986 A | * 8/1967 | Boucher | 141/78 |
| 3,571,971 A | * 3/1971 | Broersma | 47/1.01 R |
| 4,947,579 A | * 8/1990 | Harrison et al. | 111/105 |
| 4,998,945 A | * 3/1991 | Holt et al. | 47/1.01 R |
| 5,247,761 A | * 9/1993 | Miles et al. | 111/104 |
| 5,641,008 A | 6/1997 | Ellis | 141/129 |
| 5,881,655 A | * 3/1999 | Edmonds et al. | 111/105 |

FOREIGN PATENT DOCUMENTS

| | | | |
|---|---|---|---|
| DE | 19642823 A1 | * 4/1997 | A01G/9/08 |
| JP | 08172927 A | * 7/1996 | A01G/9/08 |
| JP | 08308389 A | * 11/1996 | A01G/9/08 |
| JP | 08322392 A | * 12/1996 | A01G/9/08 |

* cited by examiner

*Primary Examiner*—Charles T. Jordan
*Assistant Examiner*—Jeffrey L. Gellner
(74) *Attorney, Agent, or Firm*—Nixon & Vanderhye PC (57) ABSTRACT

Plant potting machines and methods have synchronized continuous motion pot track and soil drilling systems. In especially preferred forms, potting machines and methods of forming a planting recess in soil contained within a pot are provided which move a soil-filled pot continuously along a linear segment of a pot track, and move a drill bit continuously in synchronized registry with the soil-filled pot at the same time as the pot moves continuously along the linear segment of the pot track. Most preferably, simultaneous horizontal and vertical motion components are imparted to a soil-drilling drill bit relative to the linear segment of the pot track, for example, by moving the drill bit in an arcuate (preferably circular) orbit above the pot track. Such simultaneous horizontal and vertical motion components cause the drill bit to track linearly in registry with the pot conveyed by the pot track along the linear segment thereof and to be moved vertically into and out of contact with soil contained within the pot to thereby drill the planting recess therein.

22 Claims, 8 Drawing Sheets

POTTING MACHINES AND METHODS

FIELD OF THE INVENTION

The present invention relates generally to machines and methods which assist in plant potting operations.

BACKGROUND AND SUMMARY OF THE INVENTION

Horticultural growers have a need to periodically place growing plants (e.g., seedlings, shrubs, flowers, and the like) in pots of sufficient size so as to accommodate future growth. Once the potted plants have attained a desired size, therefore, they can be sold to retail nurseries, landscape companies or the like for transplanting to a permanent site.

Potting machines which assist the horticultural growers in placing their plants into soil-containing pots are well known. In this regard, most potting machines include a soil infeed conveyor which transfers potting soil from a soil supply to a soil lift conveyer which elevates the soil over and into pots travelling along a closed-loop pot track. Recently, potting machines have been disclosed in U.S. Pat. No. 5,641,008 (the entire content of which is expressly incorporated hereinto by reference, and referred to hereinafter as "the '008 patent") which includes coordinated indexing and soil drilling systems. The indexing system serves to sequentially continually advance the plant pots along the potting path so that each pot on the track is brought into a momentary stationary indexed relationship with a reciprocally moveable drill assembly associated with the soil drilling assembly. During such momentary stationary indexed relationship, therefore, the drilling assembly serves to drill a generally centrally located recess in the soil contained within the pot to facilitate the placement of a plant therein.

While the potting machines and methods disclosed in the '008 patent are entirely satisfactory for relatively small pot sizes (e.g., 5-gallon pots or less), problems tend to arise when relatively large pot sizes (e.g., between about 10-gallon to about 25-gallon pots) are handled.

Specifically, the larger pot sizes necessarily require a greater volume of soil and require a recess that is proportionally larger and deeper as compared to the smaller pot sizes (i.e., since proportionally larger root balls need to be planted in the larger pot sizes). As a result, the continual stopping/starting of the pot track as disclosed in the '008 patent is not entirely satisfactory for larger pot sizes as soil in the pots has a greater tendency to shift due to its greater mass weight thereby collapsing the drilled recess before a plant can be placed therein.

It would therefore be highly desirable if plant potting machines and methods were provided which are especially adapted to the handling of relatively large pot sizes. It is towards fulfilling such a need that the present invention is directed.

Broadly, the present invention is directed to plant potting machines and methods having synchronized continuous motion pot track and soil drilling systems. In especially preferred forms, the present invention is embodied in potting machines and methods of forming a planting recess in soil contained within a pot by moving a soil-filled pot continuously along a linear segment of a pot track, and moving a drill bit continuously in synchronized registry with the soil-filled pot as the pot moves continuously along the linear segment of the pot track. More specifically, according to the present invention simultaneous horizontal and vertical motion components are imparted to a soil-drilling drill bit relative to the linear segment of the pot track, for example, by moving the drill bit in an arcuate (preferably circular) orbit above the pot track. Such simultaneous horizontal and vertical motion components cause the drill bit to track linearly in registry with the pot conveyed by the pot track along the linear segment thereof and to be moved vertically into and out of contact with soil contained within the pot to thereby drill the planting recess therein.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
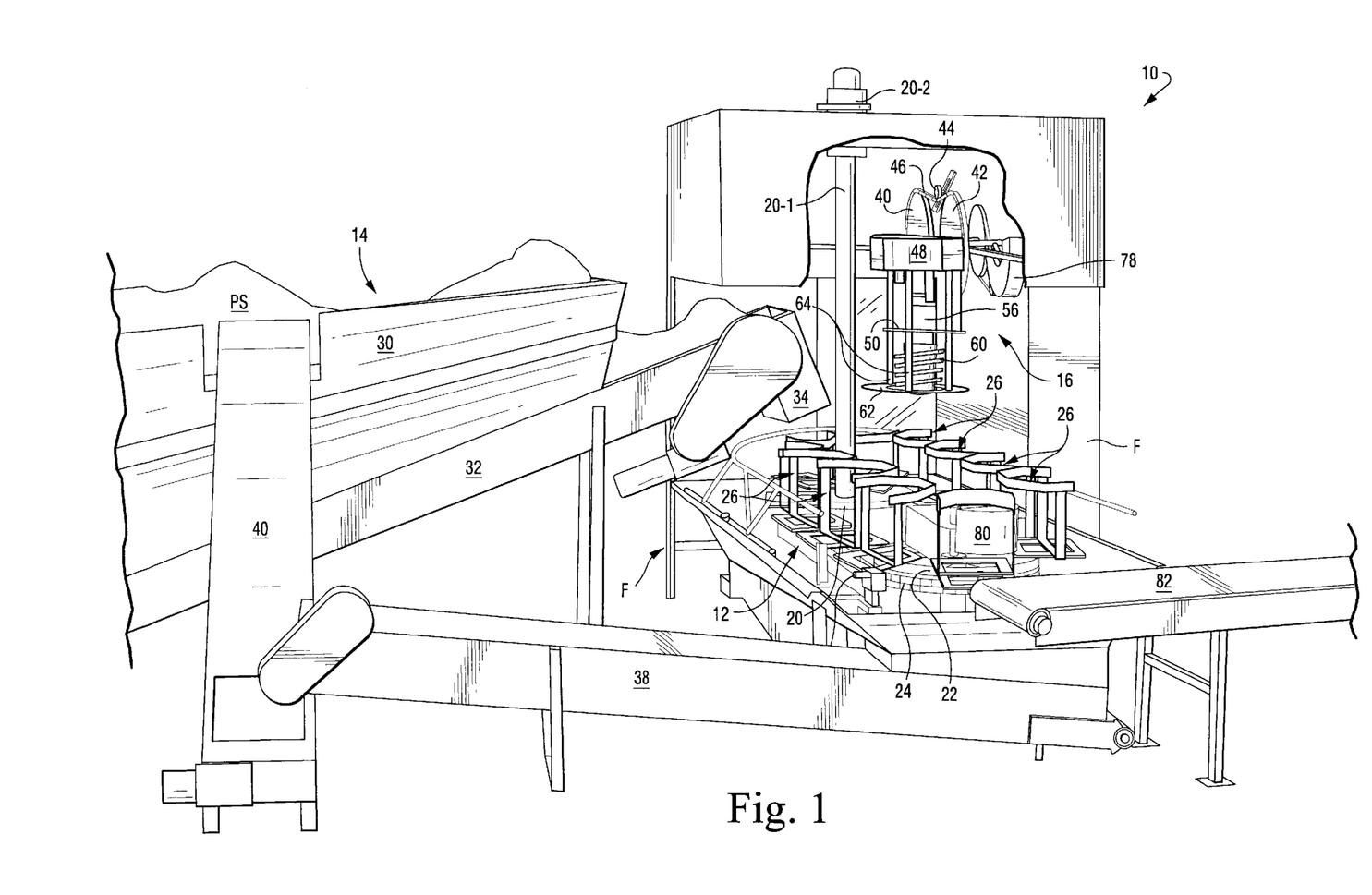
FIG. 1 is a perspective view of a particularly preferred exemplary potting machine embodying the present invention.
Figure 2:
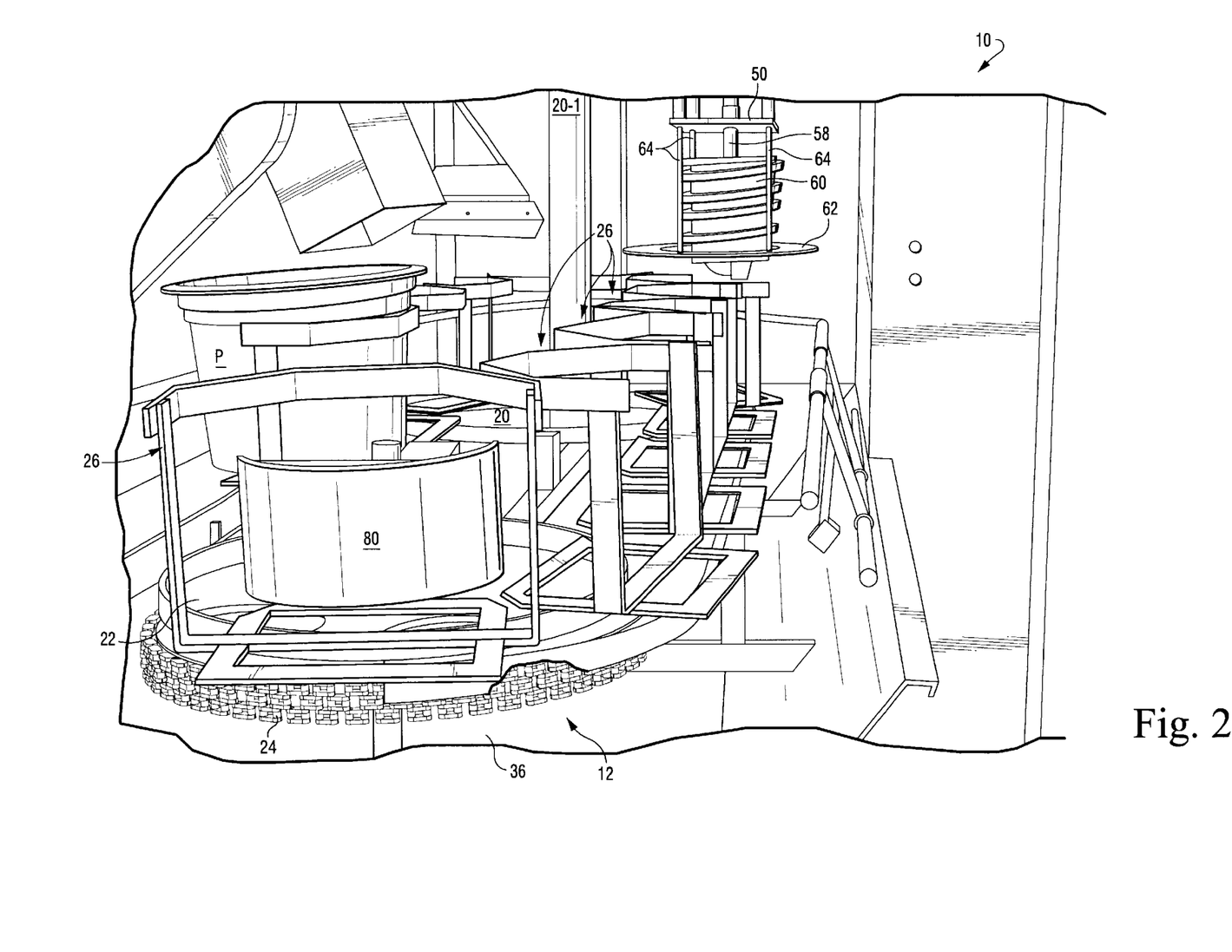
FIG. 2 is a closer perspective depiction of the pot track of the potting machine shown in FIG. 1 as viewed generally from the pot discharge position thereof.

Accompanying FIGS. 1 and 2 show a particularly preferred potting machine 10 embodying the present invention. As can be seen, the potting machine 10 includes generally a pot track system 12, a soil handling system 14, and a soil drilling system 16.

The pot track system 12 essentially includes separated sprockets 20, 22 which are engaged with an endless belt chain 24. A series of pot holders 26 are connect to, and thus supported by, the belt chain 24. In this regard, accompanying FIG. 2 shows an exemplary large-capacity pot P positioned in one of the pot holders 26, it being understood of course that during operation, other pots P would likewise be held in others of the pot holders 26. A vertically oriented drive shaft 20-1 is connected operatively between the sprocket 20 at one end thereof and to a drive motor 20-2 at the other end thereof. The motor 20-2 serves to rotate continuously the drive shaft 20-1 which in turn rotates the sprocket 20. As such, the belt chain 24 will therefore responsively be moved around the sprockets 20, 22 thereby carrying the individual pot holders 26 continuously along the closed-loop path established by the chain 24.

The soil handling system 14 is most preferably comprised of a soil feed hopper 30 and its associated soil feed conveyor 32. The hopper 30 provides an available stand-by source of potting soil PS which is carried to the discharge cute 34 by the conveyor 32 and deposited into an awaiting pot P (see FIG. 2). Excess soil which is not deposited into the pot P falls by gravity onto a lower recycle conveyor 36 (see FIG.

2) which serves to transfer such excess soil from the filling operation (as well as excess soil removed from the pot P by virtue of the soil drilling operation by means of the drilling system 16) to a return conveyor 38. The return conveyor 38 transfers the soil to a lift conveyor 40 to thereby deposit the soil back into the soil feed hopper 30 which it may again be conveyed by the conveyor 32 into another awaiting empty pot P. In such a manner, therefore, soil build-up below the pot track system 12 is prevented while at the same time ensuring that the potting soil PS is conserved and used for its intended purpose.

In the embodiment of the potting machine 10, the pot track system 12 is continuously moved in a clockwise direction as viewed from the top of FIG. 1. Thus, after being filled with potting soil PS, the pots P will be conveyed continuously by the pot track system 12 and be presented to the soil drilling system 16. As is perhaps more clearly depicted in FIGS. 3 and 4, the soil drilling system 16 is positioned above a linear segment of the endless pot tract, and is most preferably comprised of a pair of horizontally spaced-apart support sprockets 40, 42 interconnected by means of a continuous drive chain 44. An adjustable tensioner pulley 46 is provided so as to allow adjustable tensioning of the drive chain 44. Bearing blocks 40-1, 40-2 operatively associated with the support sprockets 40, 42 are supported by a structural beam B1 forming a component part of the supporting frame F of the potting machine 10. Similarly, structural beam B2 serves to support the adjustment bar 44-1 to which the tensioner pulley 44 is mounted.

Figure 3:
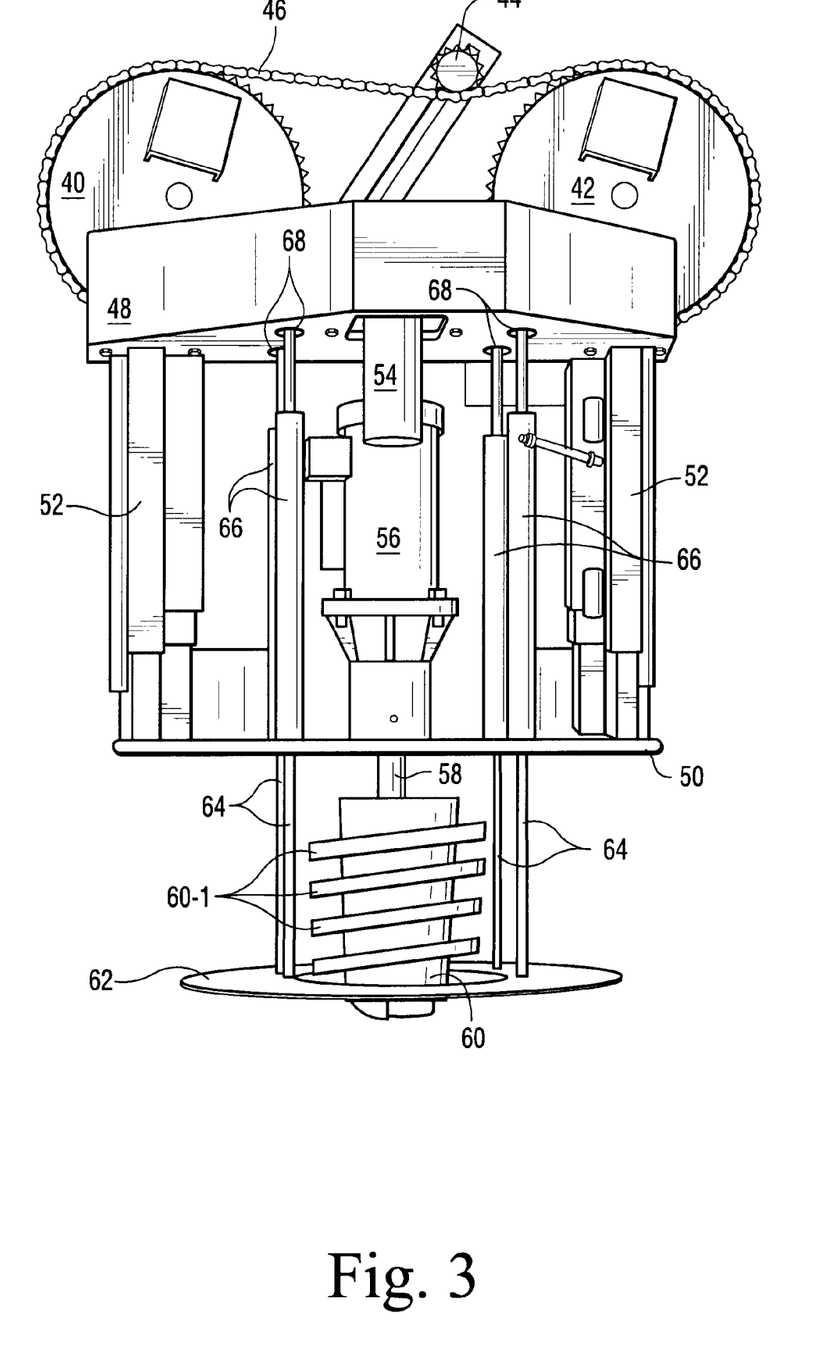
FIG. 3 is a detailed elevational view of the soil drilling system in accordance with the present invention.
Figure 4:
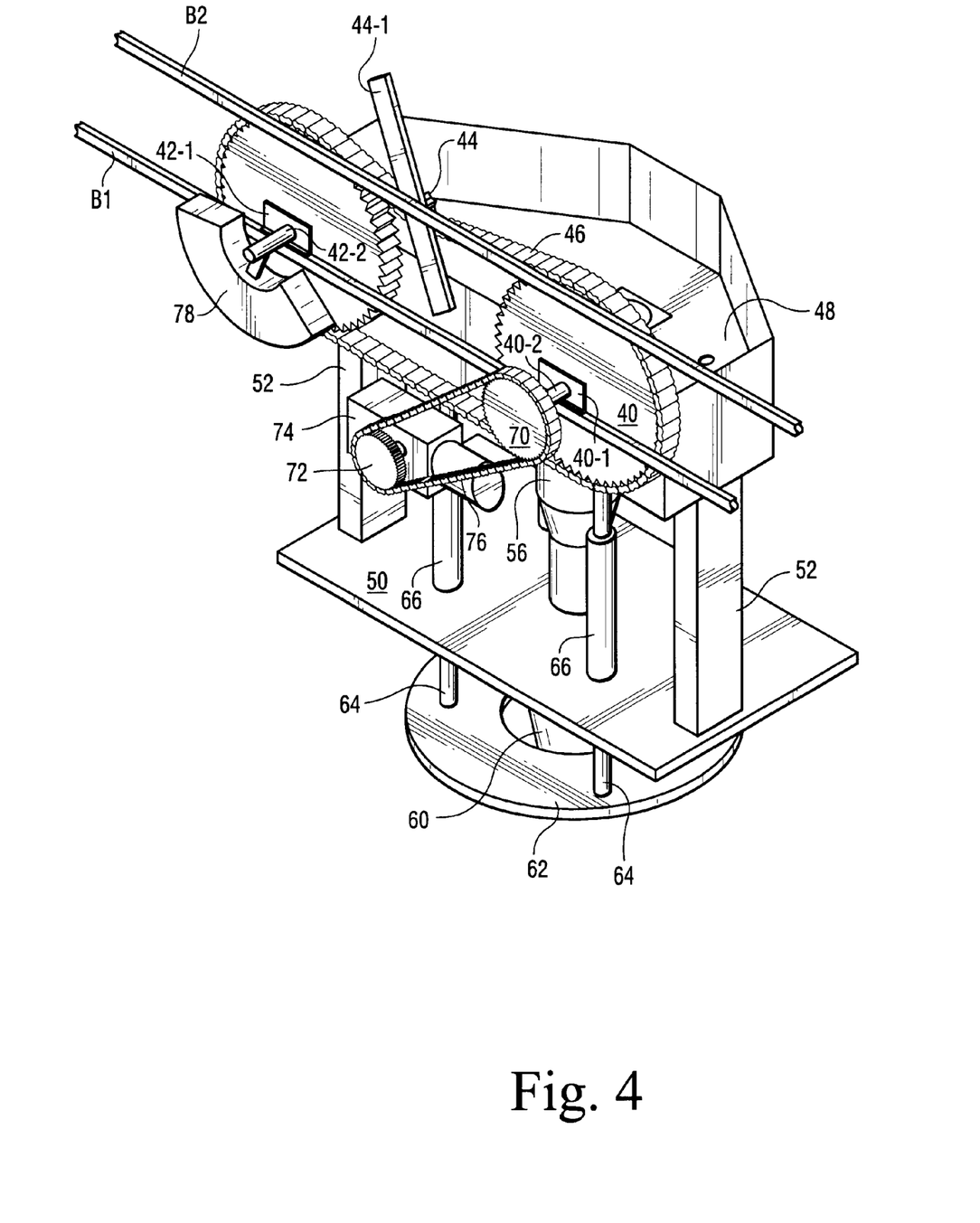
FIG. 4 is a rear perspective view of the soil drilling system depicted in FIG. 3.

A horizontally disposed upper support platform 48 is mounted rigidly (e.g., by welding) in a cantilevered manner to corresponding eccentric locations on the respective faces of each support sprocket 40, 42. A horizontally disposed lower support platform 50 is vertically spaced in a dependent manner below the upper platform 48 and is connected to the latter by adjustable support posts 52. A motor 54 is operatively connected to the support posts 50 by means of an adjustment chain (not shown) so as to permit the lower platform 50 to be raised and lowered relative to the upper platform 48 and hence relative to the pots P in the pot track system 12. By adjusting the vertical spacing between the platforms 48, 50, the depth of the recess drilled into the soil-filled pots P may be selected.

The lower support platform 50 supports a drill motor 56 connected to one end of the drive shaft 58 associated with the drill bit 60. When the drill bit 60 is brought into contact with the soil contained within an await soil-filled pot P (as will be described in greater detail below), the rotation of the drill bit 60 by the drill motor 56 will thereby responsively cause the screw flights 60-1 thereof to physically lift soil from the pot P and thereby form the desired recess into which a plant may be placed.

An annular compaction ring 62 surrounds the drill bit 60 and is supported by the lower support plate 50. The compaction ring 62 is mounted for reciprocal travel between towards and away from the support platform 50 by means of spring-biased support rods 64 slideably received with vertical support cylinders 66. The support cylinders 66 include spring members (not shown) which bias the compaction ring 62 into its lowermost position and against upward vertical displacement toward the support plate 50. Apertures 68 are formed in the upper platform 48 so as to receive the upper ends of each support rod 64 and thereby accommodate their uppermost displacement. During operation of the soil-drilling system 16, the compaction ring 62 thus serves to physically compact the soil contained within the pot P and to physically hold the soil around the recess being drilled by the dill bit 60 to thereby ensure that a well defined recess in the soil is formed.

The sprocket 40 is rotatably driven by means of a chain and sprocket drive system. Specifically, as shown in FIG. 4, the sprocket shaft 40-2 of sprocket 40 is connected to a driven sprocket 70, while a drive sprocket 72 is coupled operatively to drive motor 74. An endless drive chain 76 spans the sprockets 70, 72 and thereby transfers the rotational drive from the sprocket 72 to the sprocket 70 and hence to the support sprocket 40. Thus, by operating the drive motor 74, the support sprockets 40, 42 will each be simultaneously rotated at the same rotational speed by virtue of the interconnection provided by chain 46.

In order to balance the stress forces exerted on the support sprockets 40, 42 by virtue of the weight and cantilevered eccentric mounting of the upper support platform 48 and the structures supported thereby, a counterweight 78 is provided and connected to the rotation shaft 42-2 of the support sprocket 42.

Downstream of the drilling system 16, a worker can place a plant into the recess that had been just drilled into the potting soil contained within the pot P. Thereafter, the pot P with the newly re-planted plant therein will then continuously be conveyed to the discharge position and will be urged out of its pot holder 26 by the discharge plate 80 onto a discharge conveyor 82 (see FIGS. 1 and 2). The discharge conveyor 82 may thus transport the finished potted plant to another location (e.g., a collection trailer or growing site on the nursery grounds). A worker may then manually place an empty pot into the vacated pot holder 26 to allow the cycle to repeat itself.

Figure 5:
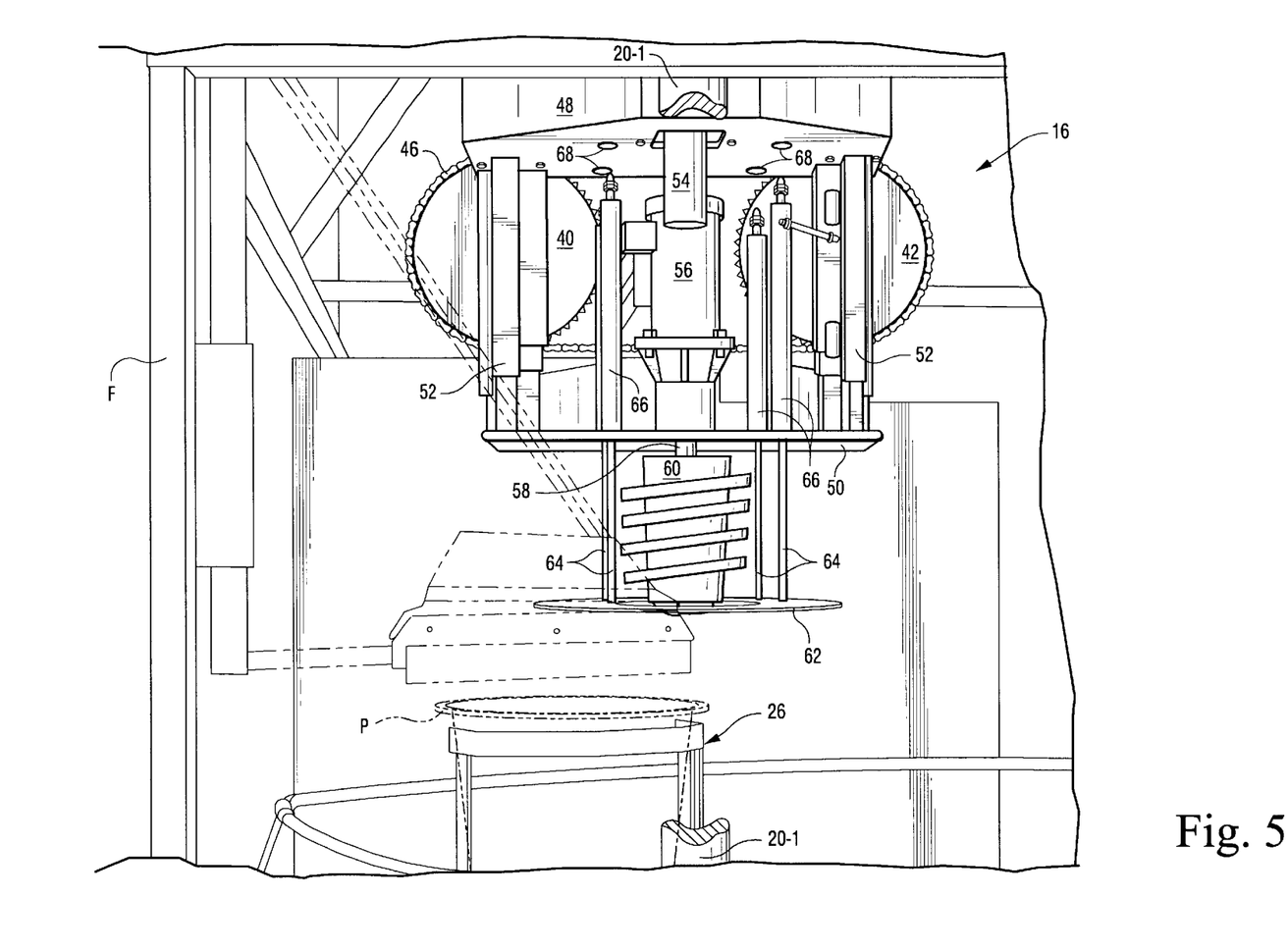
FIGS. 5–8 are detailed elevational view showing a typical operational sequence of the soil drilling system and its continuous synchronous movement relative to a soil-filled pot on the pot track.

Accompanying FIGS. 5–8 show an operational sequence of the drilling system 16 in accordance with the present invention. In this regard, accompanying FIG. 5 depicts the drilling system 16 in an initial, or starting, position in its operational sequence in that the cantilevered connections between the upper support platform 48 and the support sprockets. 40, 42 are located essentially at top center thereof relative to their respective rotation axes.

It will of course be understood that, during the sequence of operation to be described below, the sprockets 40, 42 are driven simultaneously by means of motor 74 and its associated chain drive system so as to rotate continuously about their respective rotation axes in a counterclockwise direction as viewed in FIGS. 5–8. Thus, the upper support platform 48 and the structures supported thereby, including the drill bit 60, will likewise be rotated continuously in a counterclockwise direction so as to trace a circular path whose radius or curvature is coincident with the radium of the support sprockets 40, 42. At the same time, the individual pot holders 26 will be driven continuously by the pot track system 12 by means of motor 20-2, drive shaft 20-1 and sprocket 20 so that the pot holders 26 will be presented sequentially to the soil drilling system 16. Speed synchronization between the continuous motion drilling system 16 and pot track system 12 may be achieved by a suitable programmable controller (not shown) operatively connected to the various drive motors.

Figure 6:
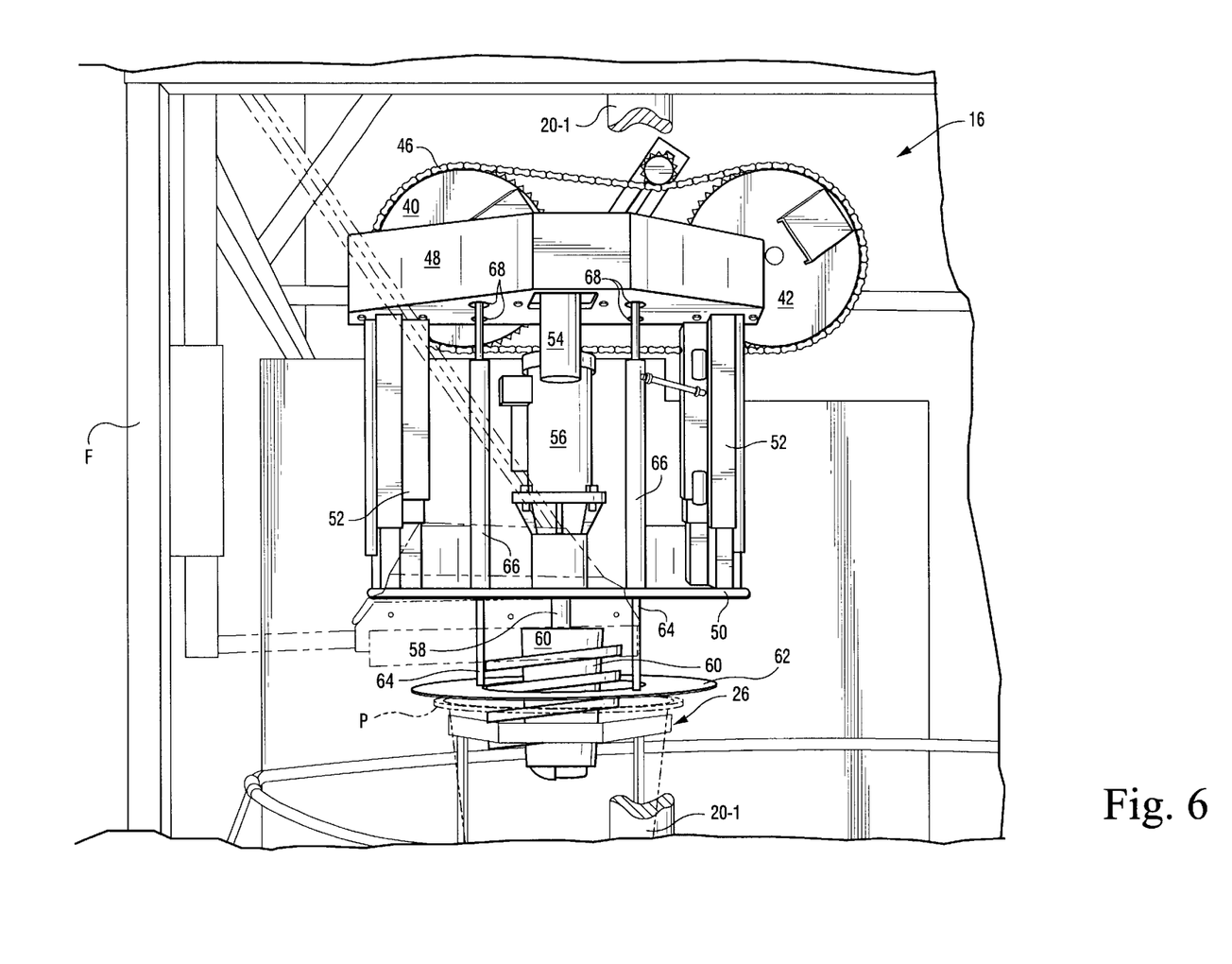
Figure 7:
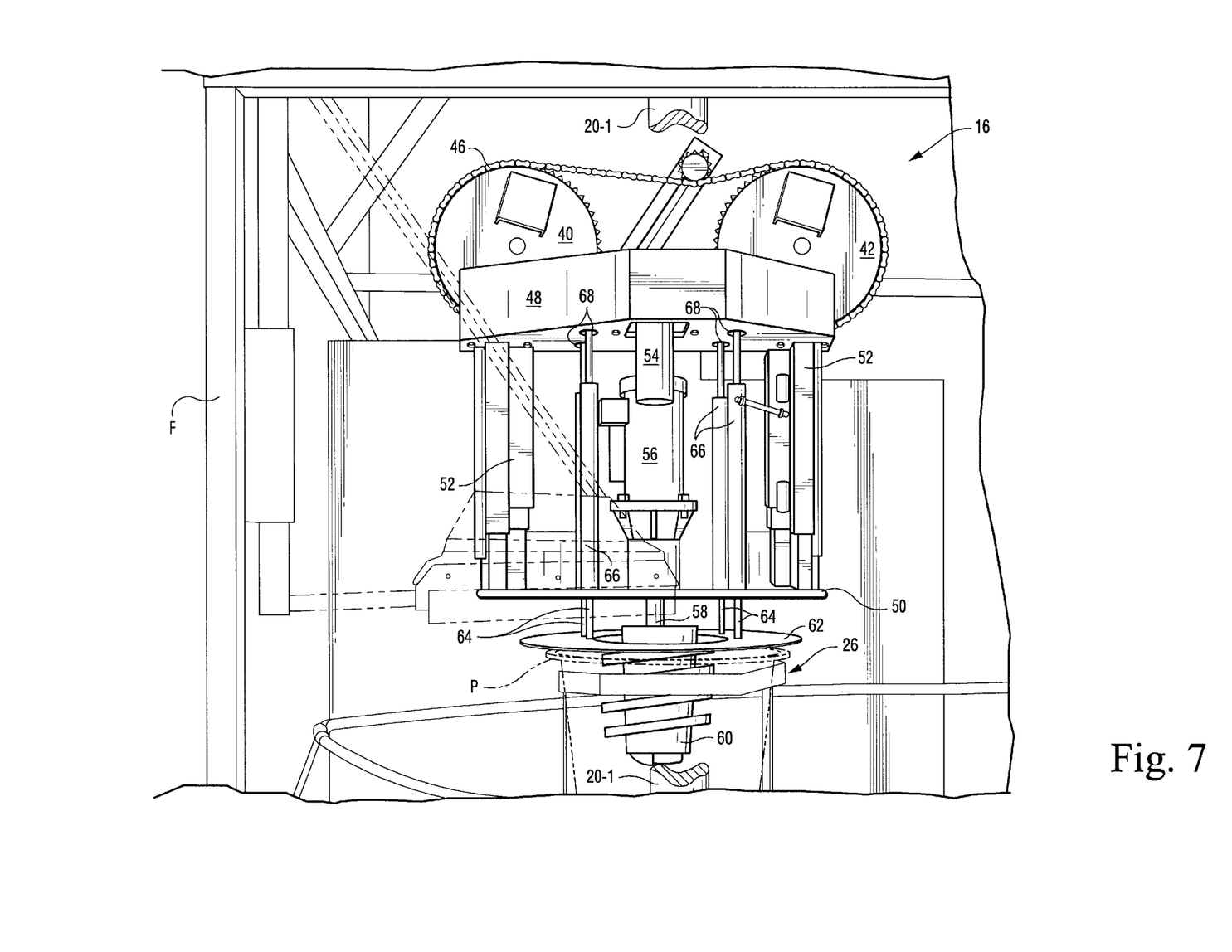
Figure 8:
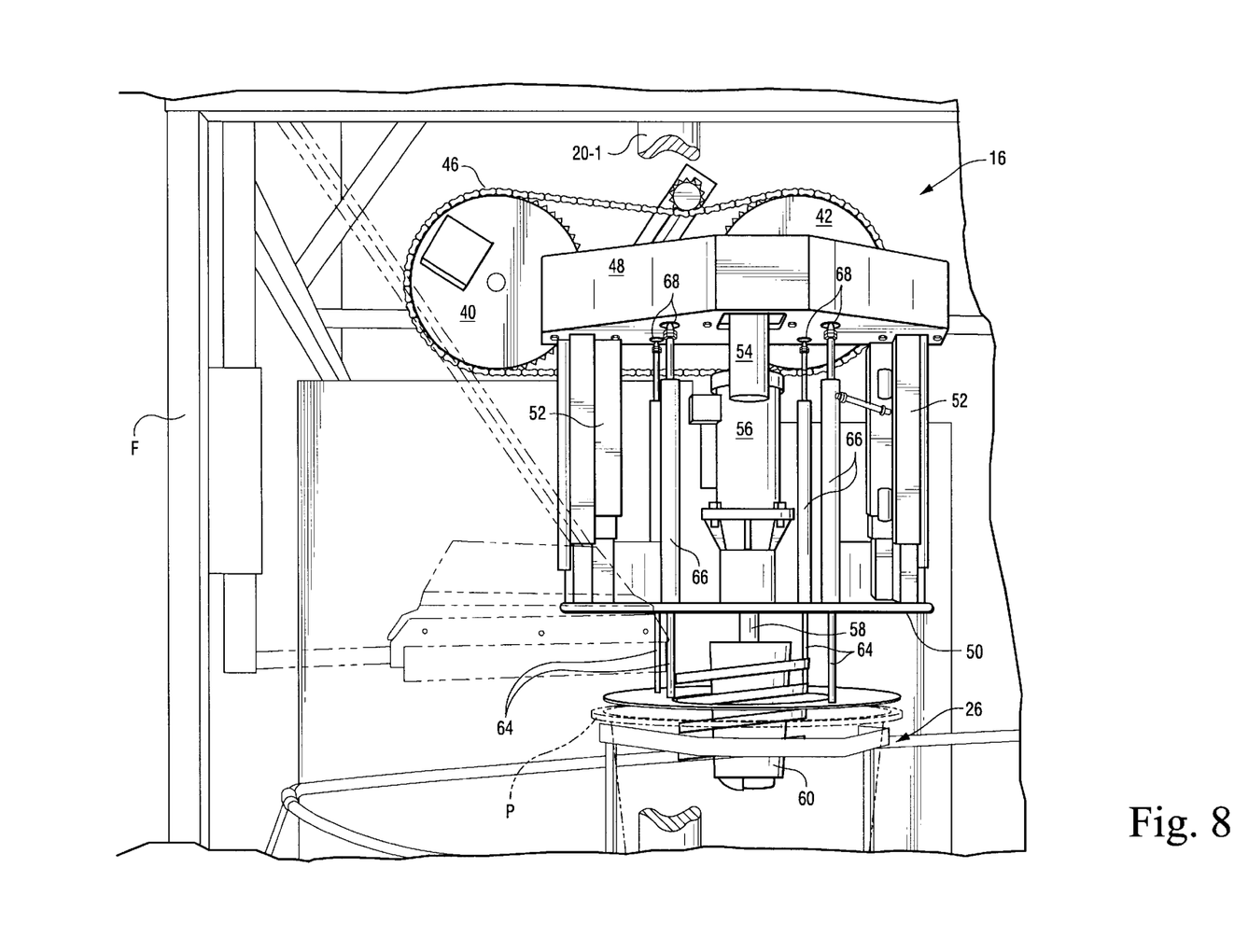

The relative positioning of the pot holders 26 and the continuous operational speeds of the pot track system 12 and soil drilling system 16 will thus be synchronized such that the drill bit 60 and the top of soil-filled pot P will be substantially vertically aligned with one another as shown in FIG. 6. At this stage in the continuous cycle, the compaction ring will have come into contact with the upper rim of the pot P and the drill bit 60 will have penetrated somewhat into the soil contained therein. Continuous synchronous rotational of the movement of the sprockets 40, 42 will thus translate into movement of the drill bit 60 having simultaneous horizontal and vertical motion components. The horizontal motion component of the drill bit 60 will thus allow it to follow the pot P within the pot holder 26 as it moves continuously along a linear segment of the pot track. At the same time, the vertical motion component of the drill bit 60 allows the drill bit 60 to be forcible lowered into the soil within the pot P to the desired maximum depth. Such a state (i.e., a state where the drill bit 60 has simultaneously tracked the pot P along the linear pot track segment and has been vertically forced to its maximum depth within the soil contained within the pot) is shown in FIG. 7.

Continued rotation of the sprockets 40, 42 will thereafter cause the drill bit 60 to be raised relative to the pot P thereby leaving a recess of desired depth in the potting soil contained therein. Ultimately, further continued rotation of the sprockets 40, 42 will cause the drill bit 60 to be vertically spaced above the pot P so that it again assumes the starting position shown in FIG. 5. The thus drilled pot can then proceed downstream of the drilling system while the next sequential pot P is presented to the drilling system, whereby the cycle repeats itself.

A variety of modifications and equivalents are envisioned and could be implemented by those skilled in this art without undue experimentation. For example, although the potting machine 10 has been described above as being especially well suited for use with relatively large-sized pots (and for that purpose includes a single, relatively large-sized drill bit 60), smaller sized pots could likewise be handled making the potting machine 10 universally suitable for a wide range of pot sizes. Thus, the single, relatively large-sized drill bit depicted in the accompanying drawings, could be replaced with a pair of smaller-sized drill bits and their associated motors. These relatively smaller-sized drill bits could then be synchronously registered with smaller sized pot holders holding relatively smaller pots. That is, each of the large sized pot holders 26 shown in the accompanying drawings could be replaced with a pair of smaller sized pot holders which would then be synchronously registered with the pair of drill bits associated with the soil drilling system 16.

Furthermore, the chain and sprocket drive system used to rotate simultaneously the support sprockets 40, 42 could be replaced with virtually any suitable equivalent drive system. For example, each of the sprockets could be driven independently by its own separate variable speed drive motor. In addition, the support sprockets 40, 42 could be replaced with suitable gearboxes and computer-controllable drive motors to effect the desired continuous orbital movement of the drill bit (i.e., so as to achieve the desired simultaneous horizontal and vertical motion components in a manner described previously). In such a case, non-circular orbital movements (e.g., elliptical or oval orbital movements) of the drill bit above the pot track could possibly be achieved, in addition to the circular orbital movements described above.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A potting machine comprising:
   a pot track having at least one linear segment along which soil-filled pots are sequentially continuously conveyed between upstream and downstream locations;
   a soil drilling system having a drill bit positioned relative to said at least one linear segment to drill a recess within soil contained within the pots; and
   a drive system for continuously moving the pot track along said at least one linear segment thereof and the soil drilling system in synchronized registry with a pot conveyed by the pot track along said at least one linear segment between said upstream and downstream locations thereof, wherein
   said drive system imparts simultaneous horizontal and vertical motion components to the drill bit of the soil drilling system relative to the at least one linear segment of the pot track to thereby cause the drill bit sequentially continuously to (i) be forcibly lowered into the soil of the pot in said pot holder at said upstream location, (ii) track the pot holder linearly along the linear segment of the pot track as said pot moves from said upstream location to said downstream location thereof, and then (iii) be withdrawn from the soil when the pot reaches said downstream location thereof to thereby drill a recess in the soil contained within the pot.

2. The potting machine of claim 1, wherein said drive system comprises a pair of support sprockets, and an endless drive chain for simultaneously rotating said pair of support sprockets.

3. The potting machine of claim 2, wherein one of said support sprockets includes a counterweight.

4. The potting machine of claim 3, further comprising a compaction ring surrounding the drill bit.

5. The potting machine of claim 2, wherein said soil drilling system includes a drill support platform for supporting said drill bit.

6. The potting machine of claim 5, wherein the drill support platform is mounted in a cantilevered manner to said support sprockets at respective eccentric locations thereof.

7. The potting machine of claim 6, wherein said drill support platform includes upper and lower support platforms, wherein said upper support platform is mounted at respective eccentric locations to said support sprockets, and wherein said lower support platform is dependently supported by said upper support platform.

8. The potting machine of claim 7, further comprising adjustable support posts connecting said upper and lower support platforms to allow for adjustments in separation distance therebetween.

9. The potting machine of claim 8, comprising reciprocally moveable mounting rods for connecting the compaction ring to the lower support platform to allow the compaction ring to move reciprocally towards and away from the lower support platform.

10. A potting machine comprising:
    a endless pot track system having a pot track which establishes a pot conveyance path;
    a soil feed system for filling pots with soil conveyed along the pot conveyance path;
    a soil drilling system having a drill bit positioned above a linear segment of the pot conveyance path downstream of the soil feed system so as to drill a planting recess in a soil-filled pot; and
    drive means for (a) moving a soil-filled pot continuously between upstream and downstream locations along the linear segment of the pot conveyance path, and (b) moving a drill bit continuously in synchronized registry with the soil-filled pot as the pot moves continuously along the linear segment of the pot conveyance path between said upstream and downstream locations thereof; wherein said drive means imparts simultaneous horizontal and vertical motion components to the drill bit relative to the linear segment of the pot conveyance path to thereby cause the drill bit sequentially continuously to (i) be forcibly lowered into the soil-filled pot at said upstream location thereof, (ii) track the soil-filled pot linearly along the linear segment of the pot track as said pot moves from said upstream location to said downstream location thereof, and then (iii) be withdrawn from the soil-filled pot at said downstream location thereof to thereby drill a planting recess within the soil-filled pot.

11. The potting machine of claim 10, wherein said drive means comprises a pair of support sprockets, and an endless drive chain for simultaneously rotating said pair of support sprockets.

12. The potting machine of claim 11, wherein said soil drilling system includes a drill support platform for supporting said drill bit,.

13. The potting machine of claim 12, wherein one of said support sprockets includes a counterweight.

14. The potting machine of claim 12, wherein the drill support platform is mounted in a cantilevered manner to said support sprockets at respective eccentric locations thereof.

15. The potting machine of claim 14, wherein said drill support platform includes upper and lower support platforms, wherein said upper support platform is mounted at respective eccentric locations to said support sprockets, and wherein said lower support platform is dependently supported by said upper support platform.

16. The potting machine of claim 15, further comprising adjustable support posts connecting said upper and lower support platforms to allow for adjustments in separation distance therebetween.

17. The potting machine of claim 16, further comprising a compaction ring surrounding the drill bit.

18. The potting machine of claim 16, comprising reciprocally moveable mounting rods for connecting the compaction ring to the lower support platform to allow the compaction ring to move reciprocally towards and away from the lower support platform.

19. The potting machine of claim 10, wherein said soil feed system includes a soil hopper, and a feed conveyor for feeding soil from the hopper to a pot conveyed along the pot conveyance path upstream of the soil drilling station.

20. The potting machine of claim 19, wherein said soil feed system comprises a recycle conveyor positioned below the pot conveyance path for receiving excess soil fed to pots conveyed along the pot conveyance path.

21. The potting machine of claim 20, wherein said soil feed system comprises a soil return conveyor system which receives the excess soil from the recycle conveyor and conveys the excess soil to the soil hopper.

22. The potting machine of claim 10, having a discharge plate positioned in the pot conveyance path downstream of the soil drilling station for pushing the soil-filled pots away from the pot track.

* * * * *